(12) United States Patent
He et al.

(10) Patent No.: US 6,526,193 B1
(45) Date of Patent: Feb. 25, 2003

(54) DIGITAL OPTICAL SWITCH

(75) Inventors: Jian-Jun He, Ottawa (CA); André Delage, Gloucester (CA)

(73) Assignee: National Research Council of Canada, Ottawa (CA)

( * ) Notice: Subject to any disclaimer, the term of this patent is extended or adjusted under 35 U.S.C. 154(b) by 130 days.

(21) Appl. No.: 09/714,256

(22) Filed: Nov. 17, 2000

(51) Int. Cl.⁷ ............................................... G02B 6/26
(52) U.S. Cl. ............................ 385/16; 385/21; 385/22; 385/31; 385/40; 385/45
(58) Field of Search ........................... 385/16, 21, 22, 385/31, 40, 45, 14, 15, 18, 24, 39, 129–132

(56) References Cited

U.S. PATENT DOCUMENTS

| 4,545,078 A | 10/1985 | Wiedeburg |
| 4,820,009 A | 4/1989 | Thaniyavarn |
| 5,013,113 A | 5/1991 | Soref |
| 5,016,960 A | * 5/1991 | Eichen et al. ............ 350/96.15 |
| 5,148,505 A | * 9/1992 | Yanagawa et al. ............ 385/16 |
| 5,288,659 A | 2/1994 | Koch et al. |
| 5,822,480 A | 10/1998 | Jeong et al. |
| 5,878,181 A | 3/1999 | Van Der Tol |
| 5,991,475 A | * 11/1999 | Nelson ........................ 385/16 |

* cited by examiner

Primary Examiner—Frank G. Font
Assistant Examiner—Michael P. Mooney
(74) Attorney, Agent, or Firm—Freedman & Associates

(57) ABSTRACT

In a digital optical switch, an input waveguide and two output waveguides form a Y-shaped splitter or switch. Electrodes are positioned on each output waveguide at the junction with the input waveguide. The electrodes extend as narrow strips across the waveguides. The inner edges of the electrodes are curved to form a smooth continuation profile to the signal paths to reduce losses.

9 Claims, 4 Drawing Sheets

DIGITAL OPTICAL SWITCH

BACKGROUND OF THE INVENTION

Optical space switches play a key role in optical communication networks. They can perform optically transparent network reconfiguration, routing, optical cross-connects and optical packet switching. In combination with passive wavelength multiplexers and demultitlexers, the space switches or switch arrays can be used to realize dynamic reconfigurable wavelength routers and wavelength add-drop multiplexers. As the dense wavelength division multiplexing (DWDM) technology is broadening its applications from mostly long-haul point-to-point transmission systems to metropolitan and local area access networks, compact, low-cost and high-performance optical switches and switch arrays will become more and more important.

Integrated planar waveguide optical switches are very attractive due to their small size, large scalability and potential for monolithic integration with waveguide DWDM (de)multiplexers. Their implementation in InGaAsP/InP material system also allows monolithic integration with semiconductor optical amplifiers that can compensate for the overall loss of the switches. While good performance in terms of loss, crosstalk and speed is important, the integrated waveguide devices have additional challenges in terms of polarization sensitivity, temperature sensitivity and wavelength dependence. A number of waveguide based optical switches have been developed. They include interferometric devices such as directional couplers and Mach-Zehnder interferometers, digital optical switches based on modal evolution in conventional Y-junction branch and based on total internal reflection (TIR), and field-induced waveguide switches.

Directional couplers and Mach-Zehnder interferometers are both based on mode interference effect. They require a precise drive-voltage or current control in order to achieve the switching with a high extinction ratior. The operating voltage or current is dependent on wavelength, thus making multi-wavelengths simultaneous switching impossible in WDM systems. They are also sensitive to polarization and temperature and have small fabrication tolerances.

Digital optical switches (DOS) exhibit a digital transfer response for a wide range of drive voltage/current. To a certain extent, they are independent of wavelength. And they are not sensitive to polarization and temperature. The most commonly used form of digital optical switch is the linear Y-junction branch as illustrated in FIG. 1. Its operating principle is based on adiabatic mode evolution rather than mode interference as in the case of directional couplers and Mach-Zehnder interferometers. In order to ensure adiabatic mode coupling, the angle between the branching waveguides needs to be very small. This leads to a long device length. Since a switch array with a large number of input/output ports requires cascading of many stages of switches, a small device length is highly desirable. The adiabatic coupling also requires that the waveguide structure be weakly guiding so that its index step can be modified by a small index change induced by the drive current/voltage. The cladding layer thickness and etching depth thus needs to be accurately controlled and fabrication-induced strain must be minimized to avoid stress-induced guiding or anti-guiding effects. Another practical issue is the crosstalk. Although several structures have been proposed to improve the crosstalk, no experiment has been reported with crosstalk lower than −20 dB and the theoretically calculated crosstalk is in the order of −25 dB for a single stage switch.

Another, form of digital optical switch, based on guided mode total internal reflection (TIR), is illustrated in FIG. 2, which shows the schematic of a TIR switch. Two single mode waveguides intersect at a small angle. A metal contact covering half of the intersection region is deposited on the top surface of the waveguide. When current is injected into the region, the refractive index decreases and a total internal reflection interface is formed which switches the light from one output port to another. The intersection angle is relatively large and therefore compact switch can be fabricated. The switch also exhibits digital response and is insensitive to wavelength and polarization. However, a large refractive index change is required in order to achieve the total internal reflection condition. Furthermore, switching characteristics of the reflection and transmission ports are unsymmetrical, which may limit its use for certain applications.

Another type of switches, based on field-induced waveguides, is schematically shown in FIG. 3. The device consists of an X- or Y-junction. The lateral optical confinement in the input branches is achieved by using ridge waveguides. In the output branches, only metal contacts are formed and no lateral confinement exists initially. When one of the output branches is reverse biased, the refractive index of the region underneath the metal contact increase (through quantum confined Stark effect or carrier depletion effect) and thus the lateral confinement is achieved. The optical signal at the corresponding output port increases due to the waveguiding effect. A major problem with this device is the high loss, since no or little optical power is transferred from the off port to the on port during the switching except for a small coupling effect in the junction region.

Typical X and Y junction switches are described in U.S. Pat. No. 5,148,505 to Hisaharu Yanagawa et al, and an optical switch with curved waveguides is described in U.S. Pat. No. 5,991,475 to William H. Nelson. These switches suffer from the same problems as outlined above. Many other optical switches are described in the prior art, having similar problems. Basically, losses at the switch are now becoming a very important factor in the overall optical system.

SUMMARY OF THE PRESENT INVENTION

The present invention provides an improved optical switch with reduced losses. Broadly a 1×2 switch comprises two intersecting curved output waveguides which connect smoothly with an input waveguide, and a particularly shaped metal contact is positioned on top of each output waveguide, at the intersection. Thus, in accordance with the present invention, an improved optical switch has an input waveguide and two output waveguides diverging from the input waveguide, extending in smooth sinuous curves from a junction. One electrode extends across each output waveguides at the junction; the electrodes are separated by a narrow gap. Each electrode on each waveguide extends in a smooth continuation of the inner edge of the other waveguide, to provide a smooth transition from the input waveguide to an output waveguide.

Figure 1:
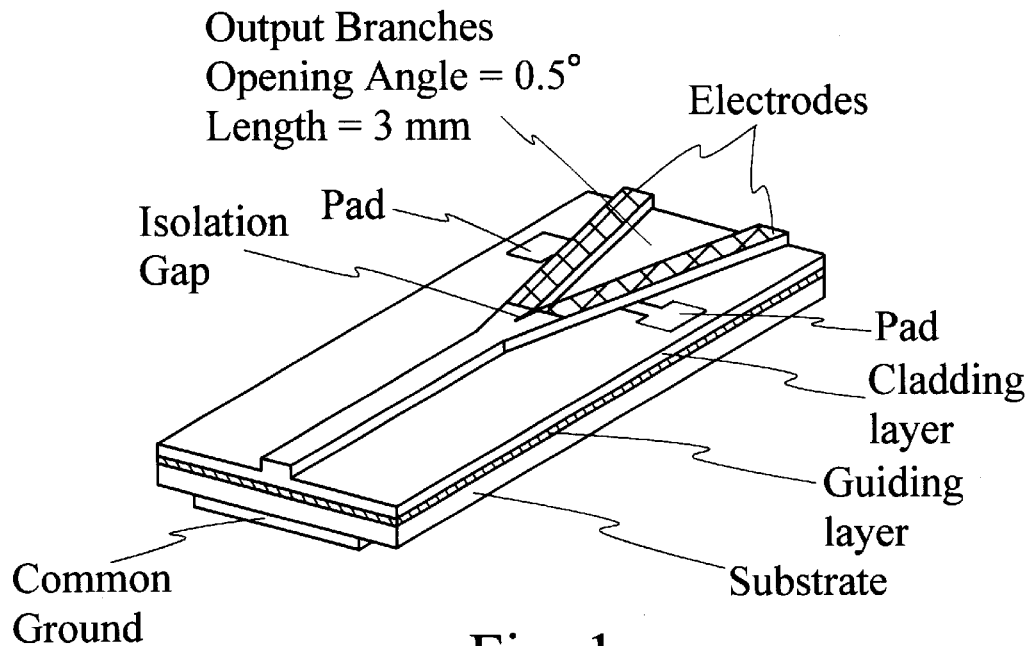
FIG. 1 illustrates a known form of linear Y function width.
Figure 2:
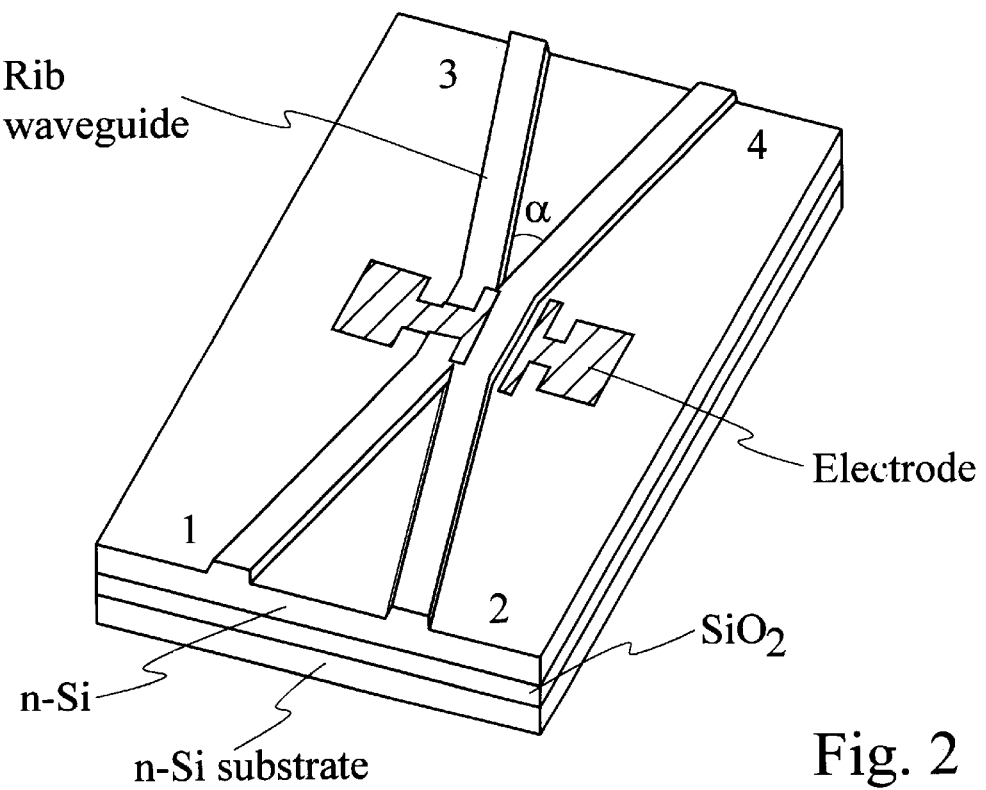
FIG. 2 illustrates a known form of a total internal reflection (TIR) switch.
Figure 3:
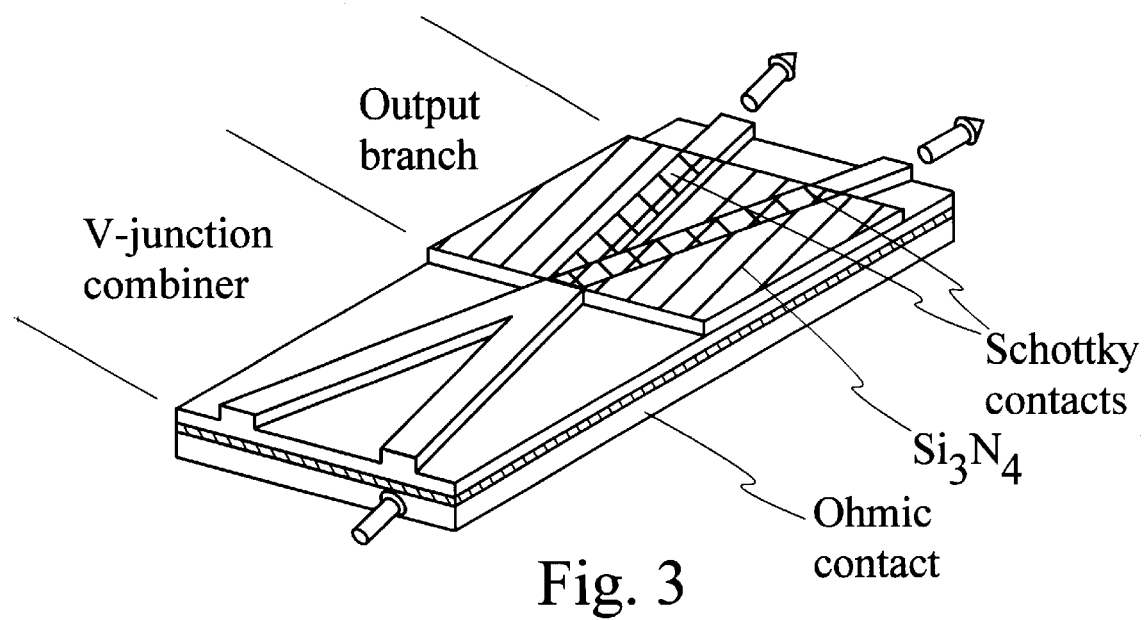
FIG. 3 illustrates a further form of known optical switch.

As described above, the form of switch illustrated in FIG. 1 is the most commonly used form of digital optical switch, having a Y-junction branch. The electrode over the output branches determines how the input at the input branch is divided between the output branches, the division ranging from 100% in one output and zero in the other to a zero in the one and a 100% in the other. Similar division can be obtained in the examples in FIGS. 2 and 3. As stated above, losses in the signals being transmitted will occur.

Figure 4:
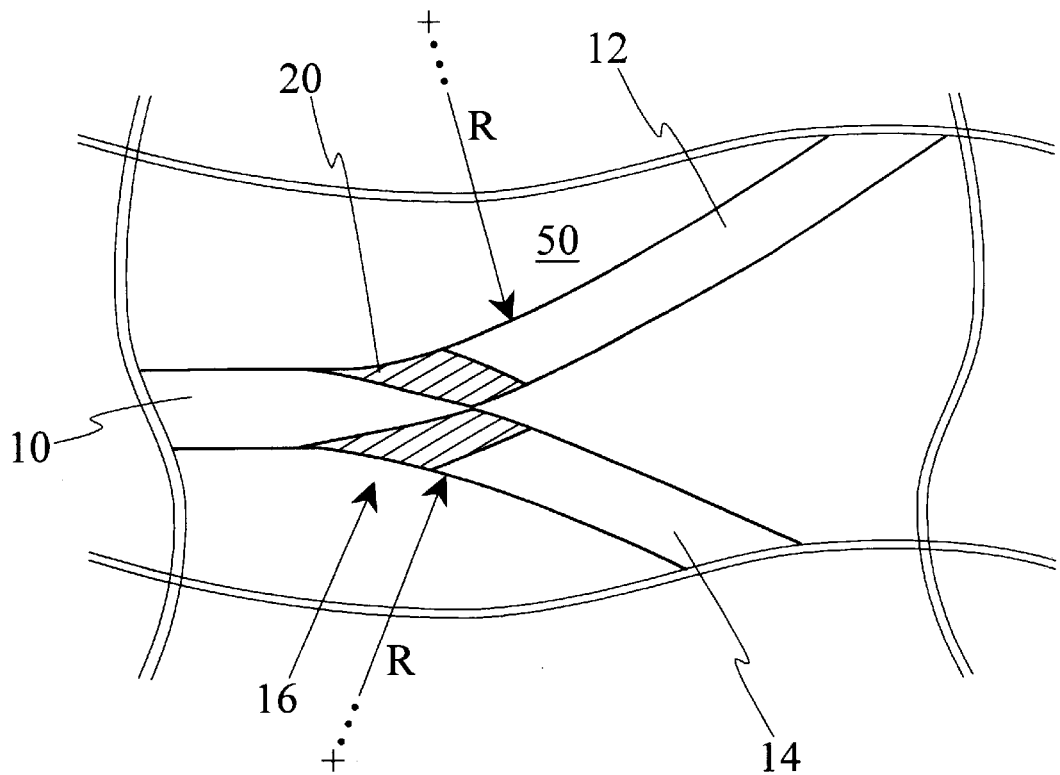
FIG. 4 is a plan view illustrating a form of optical switch in accordance with the present invention.
Figure 5:
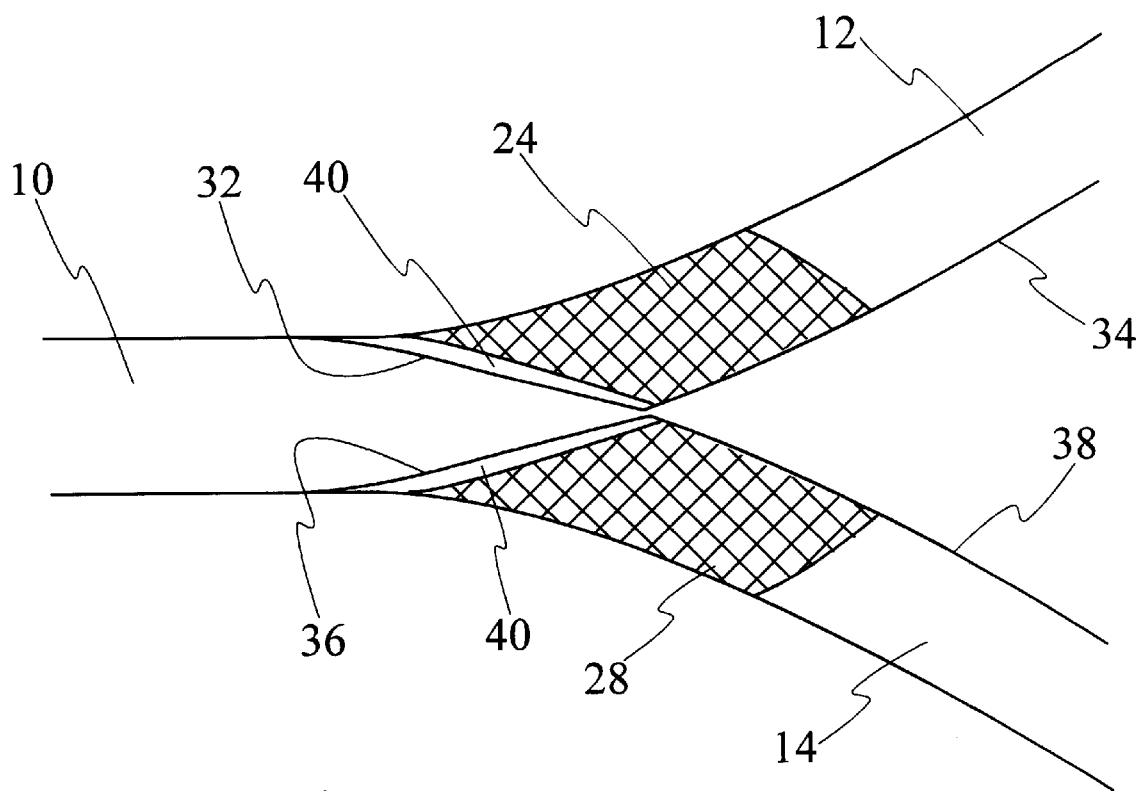
FIG. 5 is an enlarged view of the function of the switch illustrated in FIG. 4.
Figure 6:
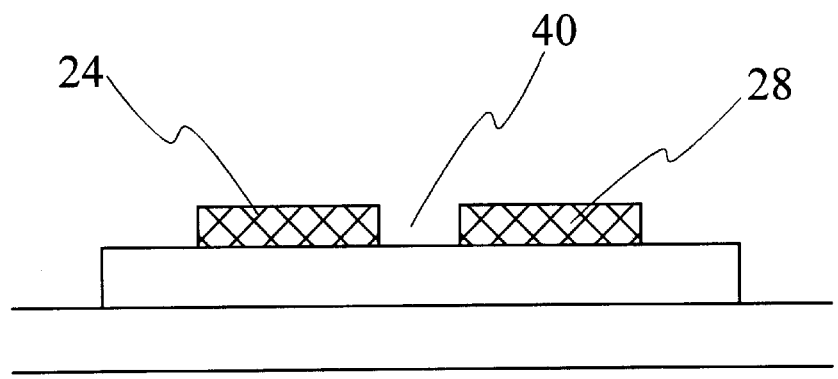
FIG. 6 is a cross-section on the line 6—6 of FIG. 5.

FIGS. 4, 5 and 6 illustrate an optical switch, or divider, in accordance with the present invention. The switch comprises an input waveguide 10 and output waveguides 12 and 14, formed on a waveguide slab 50, the waveguides 12 and 14 dividing from waveguide 10 at a junction 16. The division of the waveguides occurs in the form of smooth sinuous curves their being a smooth connection between the waveguides 12 and 14 and the waveguide 10, having a radius R.

A metal contact pattern 20 is deposited on the top of each output waveguide 12, 14. The metal contact pattern 20 is illustrated more clearly in FIG. 5. The pattern comprises one electrode 24 on waveguide 12 and one electrode 28 on waveguide 14. A smooth continuation of the inner edge 34 of the waveguide 12 extends in a smooth curved-fashion at the junction forming an inner edge 32 at the electrode 24. A gap 40 separates a line along a smooth transition from the inner edge 32 from an edge of the electrode 24 on waveguide 12. Similarly, a smooth continuation of the inner edge 38 of the waveguide 14 extends in a smooth curved-fashion at the junction forming an inner edge 36 at the electrode 28. A gap 40 separates the inner edge 36 from the electrode 28 on waveguide 14. The gap 40 has a width $\Delta$.

With an input signal on waveguide 10, and no potential applied to the electrodes 24 and 28, with no change in refractive index of the actual waveguide, the signal will be directed equally between the two output waveguides 12 and 14. If a potential is applied across electrode 24, and also across electrode 28, changing the refractive index, no signal will propagate along the output waveguides.

If a potential is applied across one of the electrodes 24, or 28, then the signal will be blocked from the waveguide having the electrode to which the potential is applied. Thus, with a potential applied to electrode 24, the signal will propagate along waveguide 14, and with a potential applied to electrode 28, the signal will propagate along waveguide 12.

It is possible to apply a potential to a conductor such that complete blockage of the signal does not occur. It is possible, by control of the applied potentials to vary the splitting of the signal from a minimum in the output and a maximum in the other waveguide to a maximum in the one output and a minimum in the other.

With the curved profiles of the electrodes 24 and 28 smooth transitions are formed from the input waveguide 10 to the output waveguides 12 and 14. This reduces losses in the switching to an extremely low level.

Conveniently, each electrode is deposited or formed as a "patch" along the smooth curve extending from the inner edges 32 and 38 and is then etched to displace the electrode edge from the smooth curve by the gap 40.

Although the symmetric Y-junction waveguide branches for the proposed 1×2 switch look similar to the conventional DOS using adiabatic mode evolution, the switching mechanism is different. In fact, its principle of operation is closer to the TIR switch if the waveguide wall formed by the carrier injection is viewed as a total internal reflection mirror. The switch is therefore very compact. The required electrode length is much shorter than the DOS using adiabatic mode evolution. Due to the curved waveguiding geometry, the required index step change is much smaller than in the case of conventional TIR switches. In addition to the formation of the waveguide wall for the onport, the waveguide at the off-branch is deformed at the same time. This further reduces the crosstalk.

Figure 7:
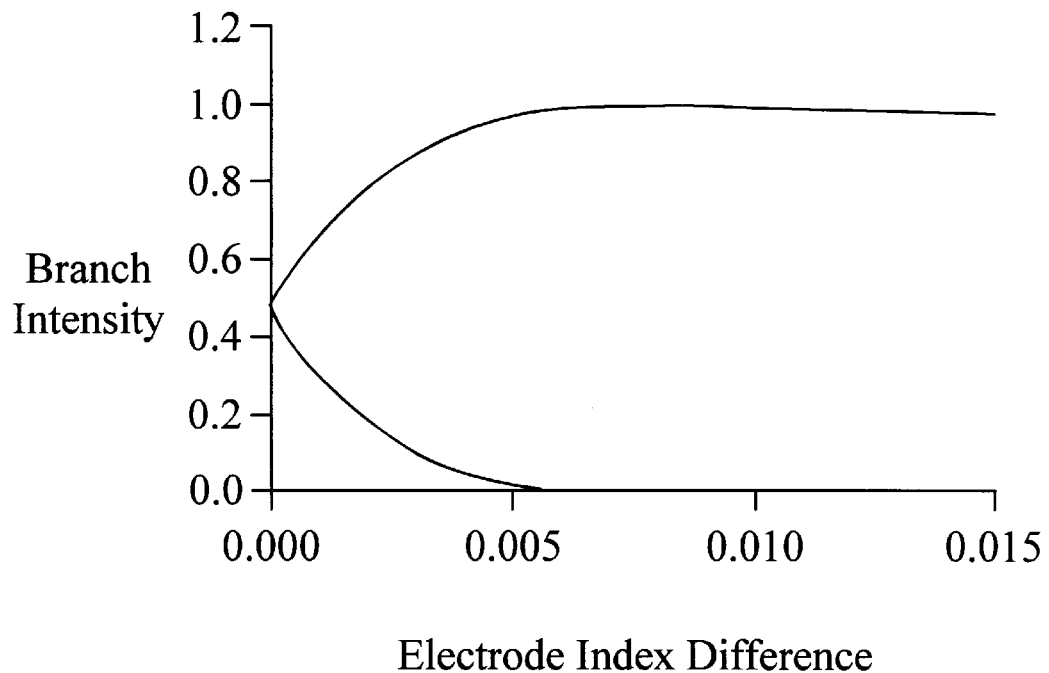
FIG. 7 illustrates the power transfer response in a switch in accordance with the present invention.

FIG. 7 shows the optical power transfer response of an InP-based 1×2 switch, in accordance with the invention, simulated using the Beam Propagation Method (BPM). In this example, the waveguide is 4 $\mu$m, the curved, waveguide radius is 28 mm and the junction angle is 1.37°. The length of the electrodes is only 360 $\mu$m. The total device length for the output port separation of 40 $\mu$m is only 1.5 mm. The effective indices of the ridge waveguide 10, 12, 14 and the surrounding slab waveguide 50 used in the simulation are 3.185 and 3.177, respectively. When no current is injected, the optical power is distributed evenly between the two output waveguides. When current is injected in one of the metal contacts, the refractive index of the waveguide branch under the electrodes decreases and the optical power is transferred to the other branch. The power is almost completely transferred with a refractive index change of only 0.005. It does not transfer back as the index further decreases, thus the digital response feature is confirmed.

Figure 8:
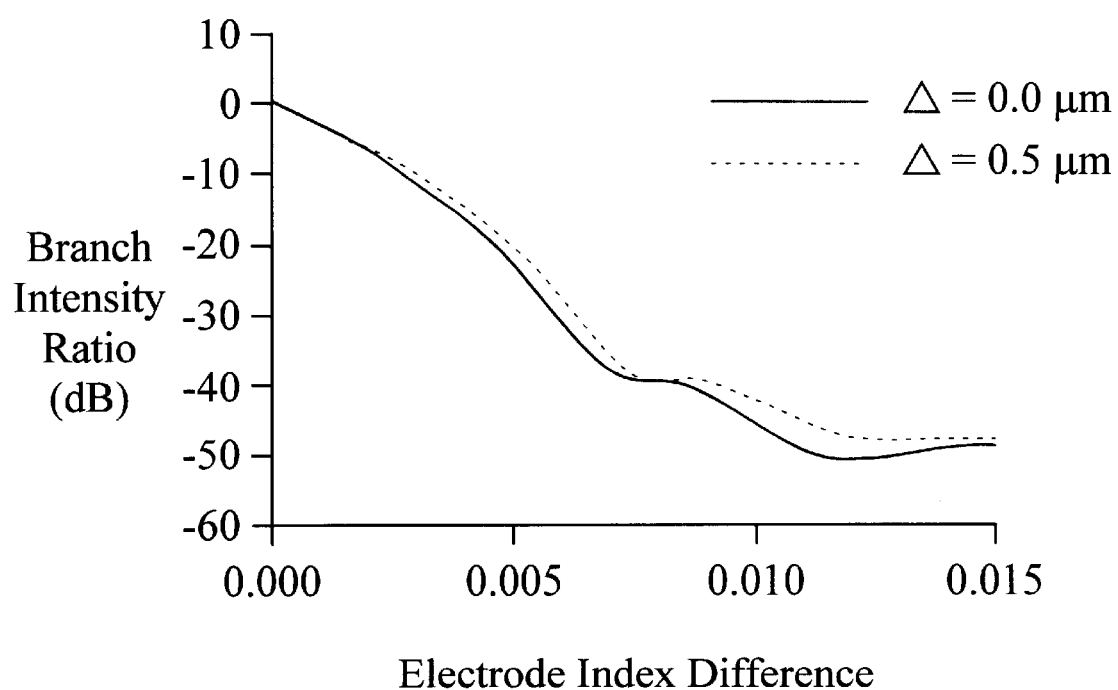
FIG. 8 shows the ratio of the optical power in the two output ports, in a logarithmic scale for two different ratios of the isolation gap.

In FIG. 8 is plotted the ratio of the optical power in the two output waveguides in logarithmic scale, for two different values of the isolation gap 40, identified as $\Delta$. It can be seen that a crosstalk of less than −40 dB can be achieved theoretically. The switching response function is not affected significantly when the isolation gap is much smaller than the waveguide width.

In summary, the proposed optical switch is compact, symmetric and has a low drive current and low crosstalk. It has a digital response characteristic that makes it insensitive to wavelength, polarization and temperature. The proposed output branching structure can also be symmetrically folded into the input side to form a 2×2 switch.

What is claimed is:

1. A digital optical switch, comprising:
    an input waveguide;
    first and second output waveguides diverging from said input waveguide at a junction said output waveguides extending in smooth sinuous curves, having a radius, from said input waveguide;
    an electrode pattern on each output waveguide at said junction, said pattern comprising at least one electrode extending across each waveguide, the at least one electrode on each waveguide being separated from each other by a narrow gap;
    each electrode on a waveguide including an inner edge extending in an approximately smooth continuation of the inner edge of the other waveguide;
    whereby, in use when one electrode is powered, a smooth transition from the input waveguide to an output waveguide is provided.

2. An optical switch as claimed in claim 1, wherein said radius is 28 mm.

3. An optical switch as claimed in claim 2, wherein the length of the electrode pairs is approximately 360 μm.

4. An optical switch as claimed in claim 1, wherein the angle subtended at said junction, by said output waveguide is 1.37°.

5. An optical switch as claimed in claim 1, wherein the electrodes are formed by depositing a single metal electrode forming a substantially smooth continuation of the inner edge of the other waveguide and etching the metal in a region thereof adjacent the edge forming the smooth continuation of the inner edge to result in two metal electrodes on two waveguides separated by a gap.

6. An optical switch as claimed in claim 1, wherein the electrodes are formed by depositing a single metal electrode forming a substantially smooth continuation of the inner edge of the other waveguide and etching the metal at said junction to result in two metal electrodes on two waveguides separated by a gap.

7. A digital optical switch, comprising:

an input waveguide;

first and second output waveguides diverging from said input waveguide at a junction said output waveguides extending in smooth sinuous curves, having a radius, from said input waveguide;

a first electrode on the output waveguides at said junction, said electrode extending across the first output waveguide and along an smooth sinuous curve from the input waveguide to the second output waveguide, the electrode and the sinuous curve being separated by a narrow gap;

a second electrode on the output waveguides at said junction, said electrode extending across the second output waveguide and along a smooth sinuous curve from the input waveguide to the first output waveguide, the electrode and the sinuous curve being separated by a narrow gap;

whereby, in use when one electrode is powered, a refractive index change in the waveguide below the electrode results in a smooth transition for light from the input waveguide to one of the first and second output waveguides.

8. A digital optical switch as defined in claim 7 wherein the length of the electrodes is approximately 360 μm.

9. A digital optical switch as defined in claim 7 wherein the waveguides is InP waveguides.

* * * * *